United States Patent [19]
Chambers et al.

[11] Patent Number: 5,933,610
[45] Date of Patent: Aug. 3, 1999

[54] PREDICTIVE ARBITRATION SYSTEM FOR PCI BUS AGENTS

[75] Inventors: Peter Chambers, Scottsdale; Gabriel Roland Munguia, Phoenix, both of Ariz.

[73] Assignee: VLSI Technology, Inc., San Jose, Calif.

[21] Appl. No.: 08/718,086

[22] Filed: Sep. 17, 1996

[51] Int. Cl.⁶ .................................................. G06F 13/362
[52] U.S. Cl. .......................... 395/293; 395/298; 395/305; 395/856
[58] Field of Search .................................... 395/293, 298, 395/299, 305, 856, 882, 306, 308, 294–297, 300–304

[56] References Cited

U.S. PATENT DOCUMENTS

| 5,265,235 | 11/1993 | Sindhu et al. . | |
| 5,506,968 | 4/1996 | Dukes | 395/728 |
| 5,574,868 | 11/1996 | Marisetty | 395/298 |

*Primary Examiner*—Ayaz R. Sheikh
*Assistant Examiner*—Ario Etienne
*Attorney, Agent, or Firm*—Wagner Murabito & Hao

[57] ABSTRACT

A predictive arbitration system for interfacing a plurality of peripheral component interconnect (PCI) agents coupled to a first PCI bus with a second PCI bus. In one embodiment, the present predictive arbitration system includes a first PCI bus adapted to transmit data signals. A plurality of PCI agents are coupled to the first PCI bus. A predictive arbiter is coupled to both the first PCI bus and a second PCI bus. The predictive arbiter is also coupled to the plurality of PCI agents. The predictive arbiter is configured to receive requests for access to the first or second PCI bus from any of the plurality of PCI agents. The predictive arbiter, upon receiving requests for access, transmits one of the requests to a second arbiter coupled to the second PCI bus, wherein the selected and transmitted request originates from a selected one of the plurality of PCI agents. The predictive arbiter is also adapted to receive a grant signal from the second arbiter in response to the selected and transmitted request. The predictive arbiter further comprises a predictive arbitration system for enabling a grant line coupled to the selected one of the plurality of PCI agents before the grant signal is received from the second arbiter.

25 Claims, 7 Drawing Sheets

PREDICTIVE ARBITRATION SYSTEM FOR PCI BUS AGENTS

TECHNICAL FIELD

The present invention pertains to the field of computer system bus architectures. More particularly, the present invention relates to a bus architecture having a peripheral component interconnect (PCI) bus master device with a common bus master interface between multiple PCI bus agents.

BACKGROUND ART

A bus architecture of a computer system conveys much of the information and signals involved in the computer system's operation. One or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. In many hardware applications, such as, graphics adapters, full motion video adapters, small computer systems interface (SCSI) host bus adapters, and the like, it is imperative that large block data transfers be accomplished expeditiously. These applications are just some examples of subsystems which benefit substantially from a very fast bus transfer rate. In many computer system architectures of today, the majority of the above mentioned subsystems reside on the computer system's expansion bus, particularly, a PCI expansion bus (hereafter PCI bus).

Figure 1:
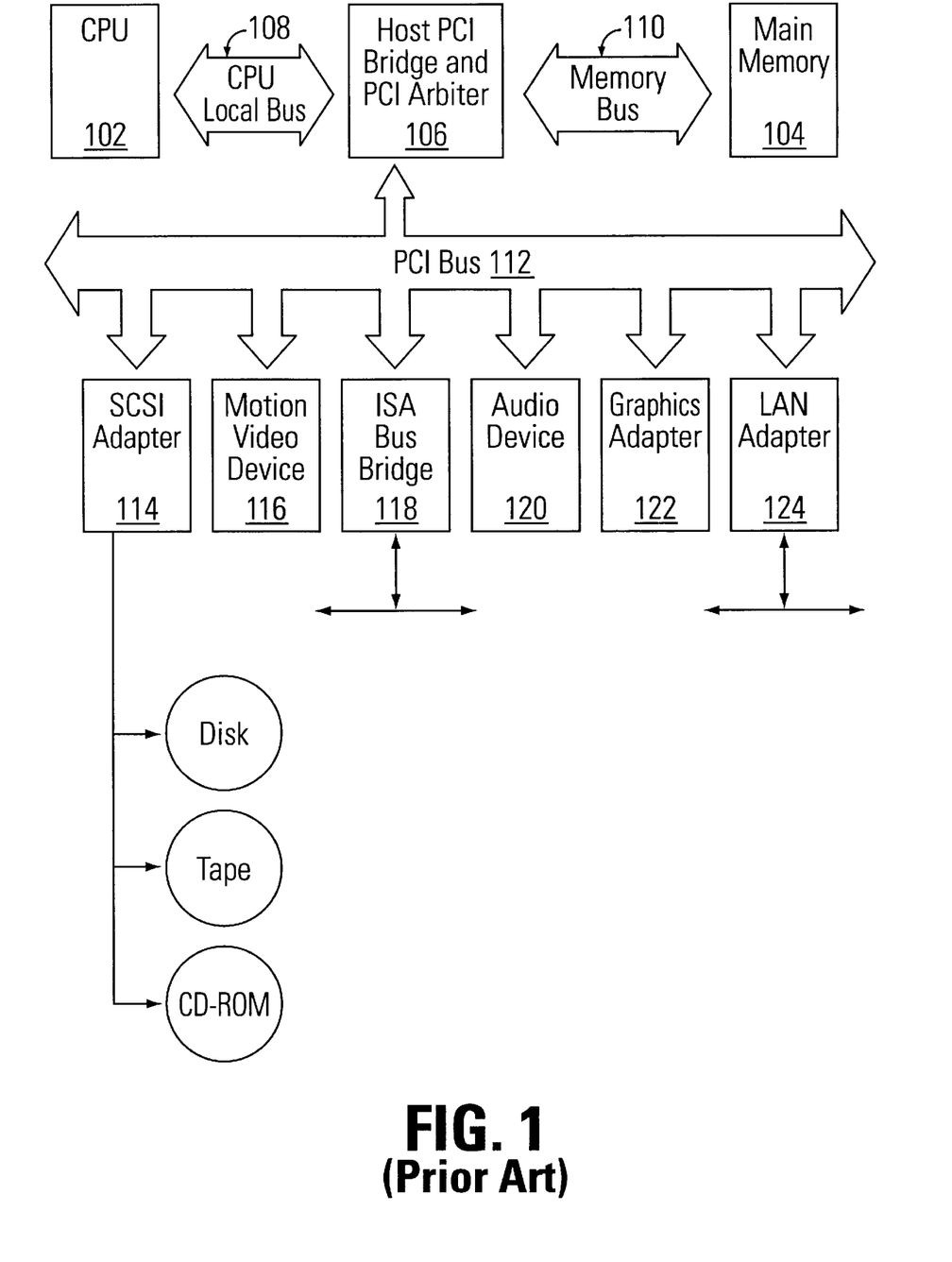
FIG. 1 shows a typical PCI bus architecture of the prior art.

PCI bus systems constitute an industry standardized, widely known, and widely used approach for transporting data within a computer system. Prior Art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is additionally coupled to arbiter 106.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, e.g., interface control lines, address/data lines, error signal lines, and the like. Each of PCI agents 114–124 are coupled to the functional signal lines comprising PCI bus 112. When one of PCI agents 114–124 requires the use of PCI bus 112 to transmit data, it requests PCI bus ownership from arbiter 106. Each of PCI agents 114–124 may independently request PCI bus ownership. Thus, at any given time, several of PCI agents 114–124 may be requesting PCI bus ownership simultaneously. Arbiter 106 grants PCI bus ownership to one of the requesting PCI agents. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates a transaction (e.g., data transfer) with a "target device" or destination device (e.g., main memory 104). When the transaction is complete, PCI bus 112 is relinquished to arbiter 106, with arbiter 106 subsequently granting PCI bus 112 to a next requesting PCI agent.

Figure 2:
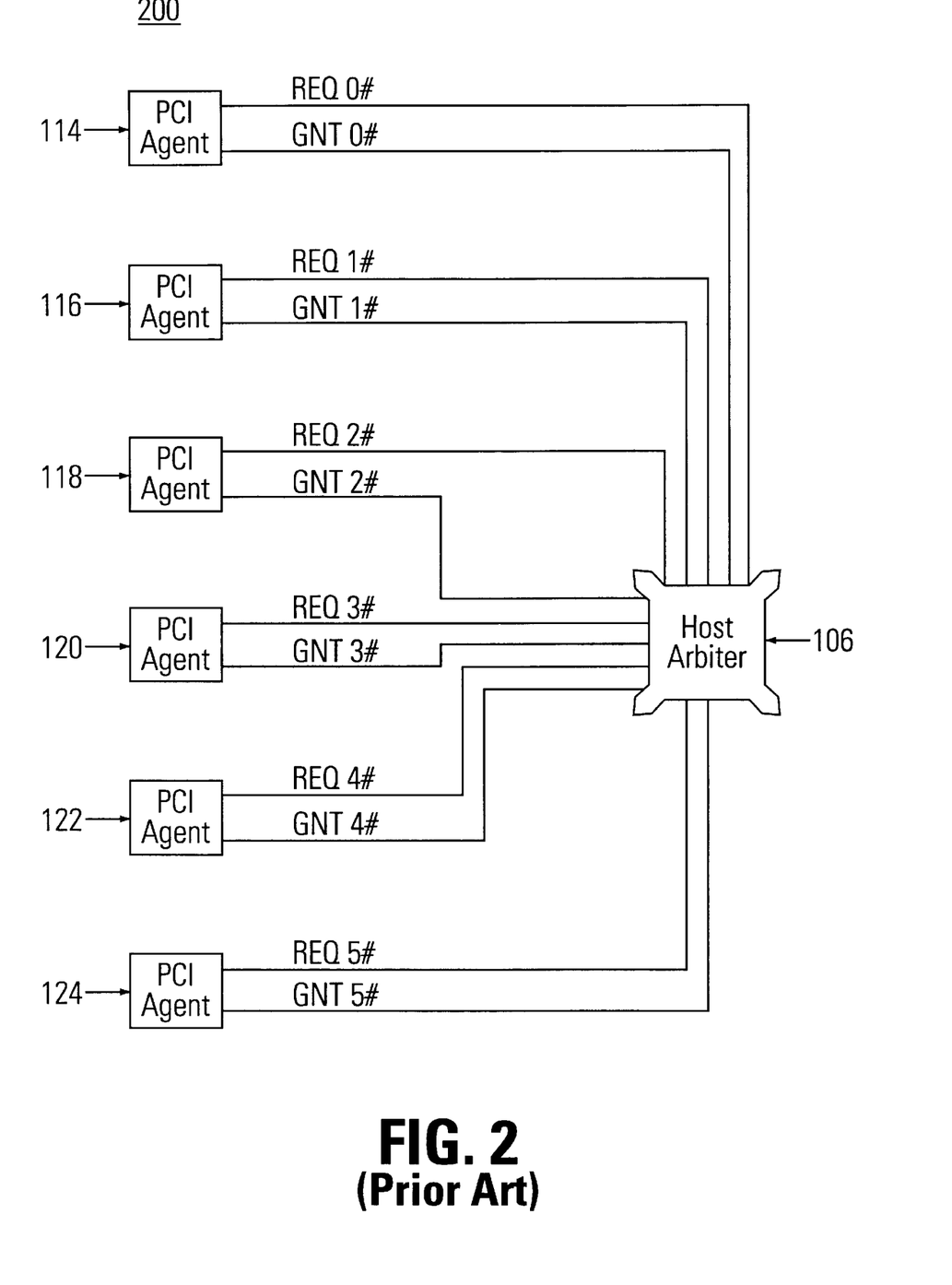
FIG. 2 shows a prior art request grant architecture.

Prior Art FIG. 2 shows a request grant architecture 200 of PCI bus architecture 100. PCI agents 114–124 are coupled to arbiter 106 via respective pairs of request lines REQ0#, REQ1#, REQ2#, REQ3#, REQ4#, and REQ5# (hereafter, request lines) and grant lines GNT0#, GNT1#, GNT2#, GNT3#, GNT4#, and GNT5# (hereafter, grant lines). The request signal lines and the grant signal lines comprise the arbitration control signal lines of PCI bus 112. However, unlike other PCI bus functional signal lines, each of PCI agents 114–124 are coupled to PCI bus 112 via its own particular request line and its own particular grant line, as shown in request grant architecture 200.

Referring still to Prior Art FIG. 2, PCI agents 114–124 request PCI bus ownership by asserting a request signal via their respective request lines. When several PCI agents request PCI bus ownership simultaneously, each requesting PCI agent asserts its respective request line. Arbiter 106 selects which of the requesting PCI agents should receive PCI bus ownership. Arbiter 106 then grants ownership by asserting the grant line corresponding to the selected PCI agent. While several of PCI agents 114–124 might have their request lines asserted, requesting PCI bus ownership from arbiter 106, at any given time, only one PCI agent will have its corresponding grant line asserted. Thus, at any given time, only one of PCI agents 114–124 will own PCI bus 112.

A first problem with the prior art request grant architecture 200 is the nature of the arbitration process. In the PCI specification (which defines the basic rules governing the operation of the PCI bus), typically, only one PCI agent can own PCI bus 112 at a time. The owning PCI agent maintains exclusive use of PCI bus 112 while executing its transaction. Other of PCI agents 114–124 requesting PCI bus ownership await a grant of PCI bus 112 from arbiter 106. In order to insure efficient allocation of PCI bus bandwidth, arbiter 106 should allocate ownership of PCI bus 112 fairly among PCI agents 114–124.

In addition, arbiter 106 should account for relative priority among PCI agents 114–124. Some PCI agents may request PCI bus ownership often and require ownership promptly due to the nature of their particular function, e.g., a local area network PCI agent, which must input and output large blocks of data promptly in order to function correctly. As such, a local area network PCI agent cannot tolerate large amounts of latency when it requests bus ownership. In comparison, an audio PCI agent typically does not constantly input and output of large contiguous blocks of data, and thus can tolerate some degree of latency.

The PCI specification does not define the method used by arbiter 106 to decide among competing PCI agents 114–124 when two or more request ownership of the PCI bus 112 at the same time. An algorithm used to decide which requesting PCI agent will be granted PCI bus ownership is often system specific. A system designer is free to determine the logic characteristics of the arbitration algorithm. Generally, prior art algorithms are simply designed to ensure high priority peripherals will not dominate the PCI bus to the exclusion of lower priority peripherals. What is required in an algorithm which can intelligently allocate PCI bus bandwidth among PCI agents of differing priority without adding unnecessary latency to the arbitration process. Such an algorithm should adequately account for priority differences among requesting PCI agents at all times possible.

A second problem is the accommodation of additional PCI agents within PCI bus architecture 100. The functions of a PCI bus architecture are implemented by a PCI chipset. A PCI chipset is a set of integrated circuits which implement the functions and parameters of the PCI bus specification. The PCI chipset defines and implements the specifications and characteristics of the PCI bus. There are a limited number of PCI agents which may be accommodated by a PCI chip set. Thus, there are a limited number of slots in which to incorporate PCI agents. If more PCI agents are desired, a hierarchical bridge to a subordinate PCI bus, which will accommodate its own set of PCI agents, is typically incorporated. The disadvantages of this solution include the added expense of the chipset implementing the PCI-to-PCI bridge function, and the bus transfer latencies added to the PCI agents on the subordinate bus.

Thus, a need exists for a system which can efficiently allocate PCI bus bandwidth among PCI agents of differing priority without adding unnecessary latency to the arbitration process. A further need exists for a system which efficiently interfaces additional PCI agents without incurring the performance and expense penalties of adding a PCI-to-PCI bridge.

DISCLOSURE OF THE INVENTION

A predictive arbitration system for interfacing a plurality of peripheral component interconnect (PCI) agents coupled to a first PCI bus with a second PCI bus is disclosed. In one embodiment, the present predictive arbitration system includes a first PCI bus adapted to transmit data signals. A plurality of PCI agents are coupled to the first PCI bus. A predictive arbiter is coupled to both the first PCI bus and a second PCI bus. The predictive arbiter is also coupled to the plurality of PCI agents. The predictive arbiter is configured to receive requests for access to the first or second PCI bus from any of the plurality of PCI agents. The predictive arbiter, upon receiving requests for access, transmits one of the requests to a second arbiter coupled to the second PCI bus, wherein the selected and transmitted request originates from a selected one of the plurality of PCI agents.

The predictive arbiter is also adapted to receive a grant signal from the second arbiter in response to the selected and transmitted request. The predictive arbiter further comprises a predictive arbitration system for enabling a grant line coupled to the selected one of the plurality of PCI agents before the grant signal is received from the second arbiter. In so doing, the present invention includes two significant benefits over prior art arbitration systems. A first benefit is zero latency grant signal timing, referring to the fact that no processing time is lost in deciding which PCI agent will receive the grant signal, thereby complying with the aggressive grant signal timing requirements of the PCI bus specification. A second benefit is continuously refined predicted arbitration, referring to the ability of the predictive arbiter to continually refine the choice regarding the destination of the grant signal, and that the choice is made before the grant signal is asserted from the second arbiter. The predictive arbiter continually refines the destination of the grant signal at each PCI bus clock cycle edge, thereby accommodating PCI agents having very different latency tolerances.

Thus, the predictive arbitration system of the present invention efficiently allocates PCI bus bandwidth among PCI agents of differing priority without adding unnecessary latency to the arbitration process. The predictive arbitration system of the present invention efficiently interfaces additional agents without incurring the performance and expense penalties of adding a PCI-to-PCI bridge.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 3:
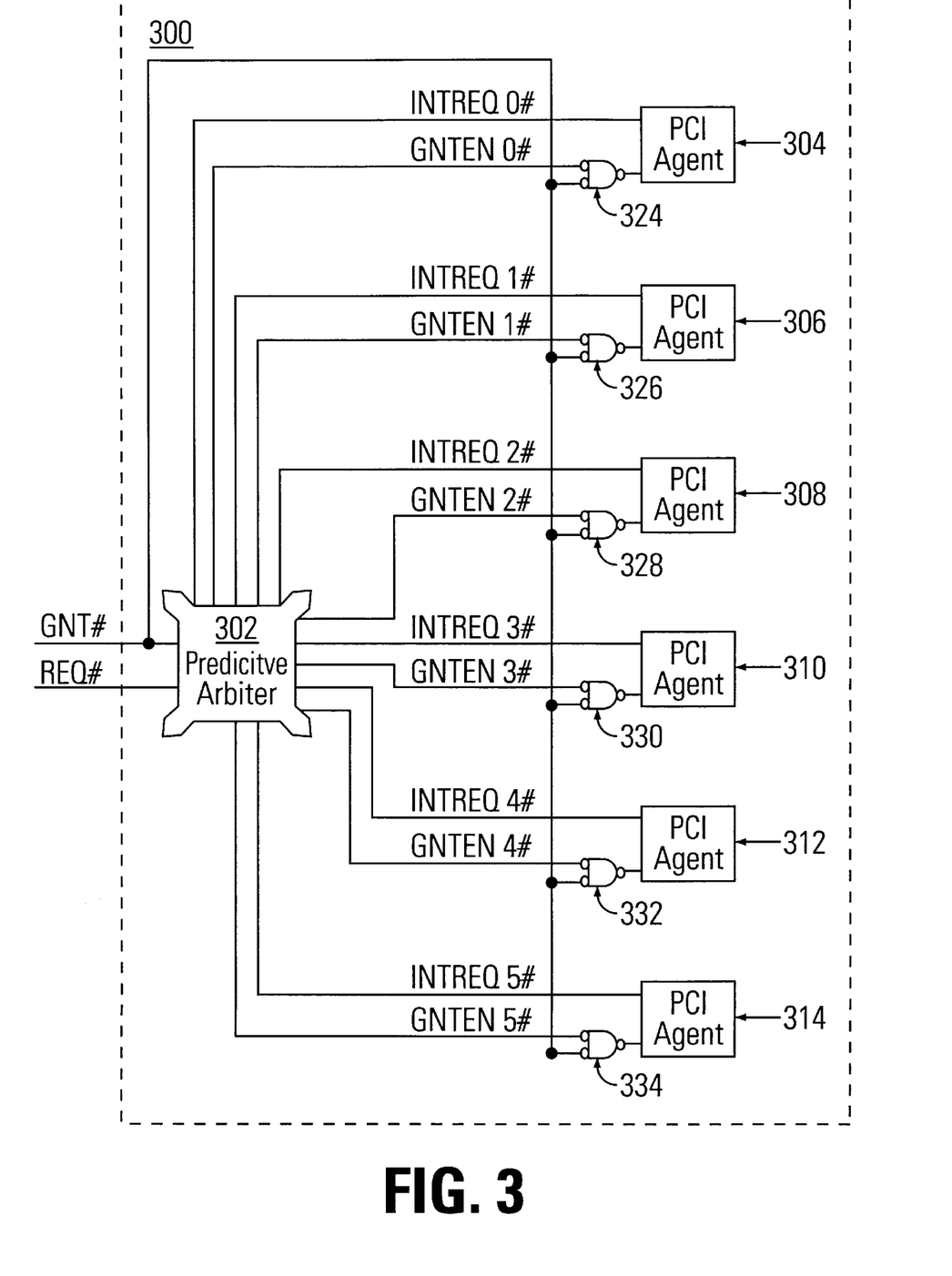
FIG. 3 shows a schematic diagram illustrating components of a predictive arbitration system in accordance with one embodiment of the present invention.

With reference now to FIG. 3, a schematic diagram illustrating components of a predictive arbitration system 300 in accordance with one embodiment of the present invention is shown. In the present embodiment, the predictive arbitration system 300 of the present invention comprises a predictive arbiter 302 coupled to a plurality of PCI agents 304, 306, 308, 310, 312, 314 (hereafter PCI agents 304–314) via respective internal request lines INTREQ0#, INTREQ1#, INTREQ2#, INTREQ3#, INTREQ4#, and INTREQ5# (hereafter internal request lines) and grant enable lines GNTEN0#, GNTEN1#, GNTEN2#, GNTEN3#, GNTEN4#, and GNTEN5# (hereafter grant enable lines). The grant enable lines couple to PCI agents 304–314 via respective active low AND gates 324, 326, 328, 330, 332, and 334 (hereafter active low AND gates 324–334). Predictive arbiter 302 is coupled to a second arbiter (not shown) via grant line GNT# and request line REQ#. Grant line GNT# is also coupled to PCI agents 304–314 via active low AND gates 324–334.

The predictive arbitration system 300 allocates PCI bus bandwidth to the plurality of PCI agents 304–314. By the time the predictive arbiter 302 receives a grant signal via GNT# from the second arbiter (not shown), it has already selected the destination of the grant signal. In so doing, the present invention provides two very significant benefits. A first benefit is zero latency GNT# timing, referring to the fact that no processing time is lost in deciding which internal agent will receive the grant signal, thereby complying with the aggressive GNT# timing requirements of the PCI specification. A second benefit is continuously refined predicted arbitration, referring to the fact that the predictive arbiter 302 is able to continually refine the choice regarding the destination of the grant signal, and that the choice is made before the grant signal is asserted via GNT# from the second arbiter(not shown). The predictive arbiter 302 continually refines the destination of the grant signal at each clock cycle edge, thereby accommodating PCI agents having very different latency tolerances. Both of these benefits are described in greater detail below.

Referring still to FIG. 3, the predictive arbiter 302 of the present embodiment is a synchronous state device that runs with the PCI clock, i.e., it is clock synchronized with the second arbiter (not shown), running synchronously with a PCI bus clock signal. At each clock edge, the predictive arbiter 302 interrogates the internal request lines for an internal request signal from any of the plurality of PCI agents 304–314. When an internal request signal is received from any of the plurality of PCI agents 304–314 the predictive arbiter 302 asserts a request signal via the request line REQ# to the second arbiter (not shown), notifying the second arbiter that one of the plurality of PCI agents 304–314 requires PCI bus ownership. Contemporaneously, the predictive arbiter 302 selects which requesting PCI agent, out of the plurality of PCI agents 304–314, will receive a grant enable signal via its respective one of the grant enable lines.

Where the predictive arbiter 302 selects a requesting PCI agent to receive a grant enable signal and a higher priority agent subsequently sends a request signal, the predictive arbiter 302 can modify the selection before receiving the grant signal from the second arbiter. It can deassert the grant enable signal to the previously selected requesting PCI agent and assert a grant enable signal to the higher priority agent, all within a single clock cycle. In this manner, the predictive arbiter 302 continuously updates the selected requesting PCI agent on a clock cycle to clock cycle basis, insuring the highest priority agent receives a grant enable signal. In many situations there can be a significant delay between the assertion of a request signal and the subsequent reception of a corresponding grant signal. In such situations, the selected requesting PCI agent may no longer be the highest priority requesting PCI agent, e.g., another higher priority PCI agent asserts an internal request signal in a time period between the assertion of a request by the predictive arbiter 302 and the reception of the corresponding grant signal. The predictive arbiter 302 of the present invention updates its selection, thereby insuring the corresponding grant signal is routed to the higher priority requesting PCI agent. In such situations, the predictive arbiter 302 may update its selection several times, each time selecting the highest priority PCI agent. Thus, the predictive arbiter 302 of the present invention efficiently allocates PCI bus bandwidth among PCI agents of differing priority. Allocation decisions are made on a clock cycle to clock cycle basis, without adding unnecessary latency to the arbitration process.

Figure 4:
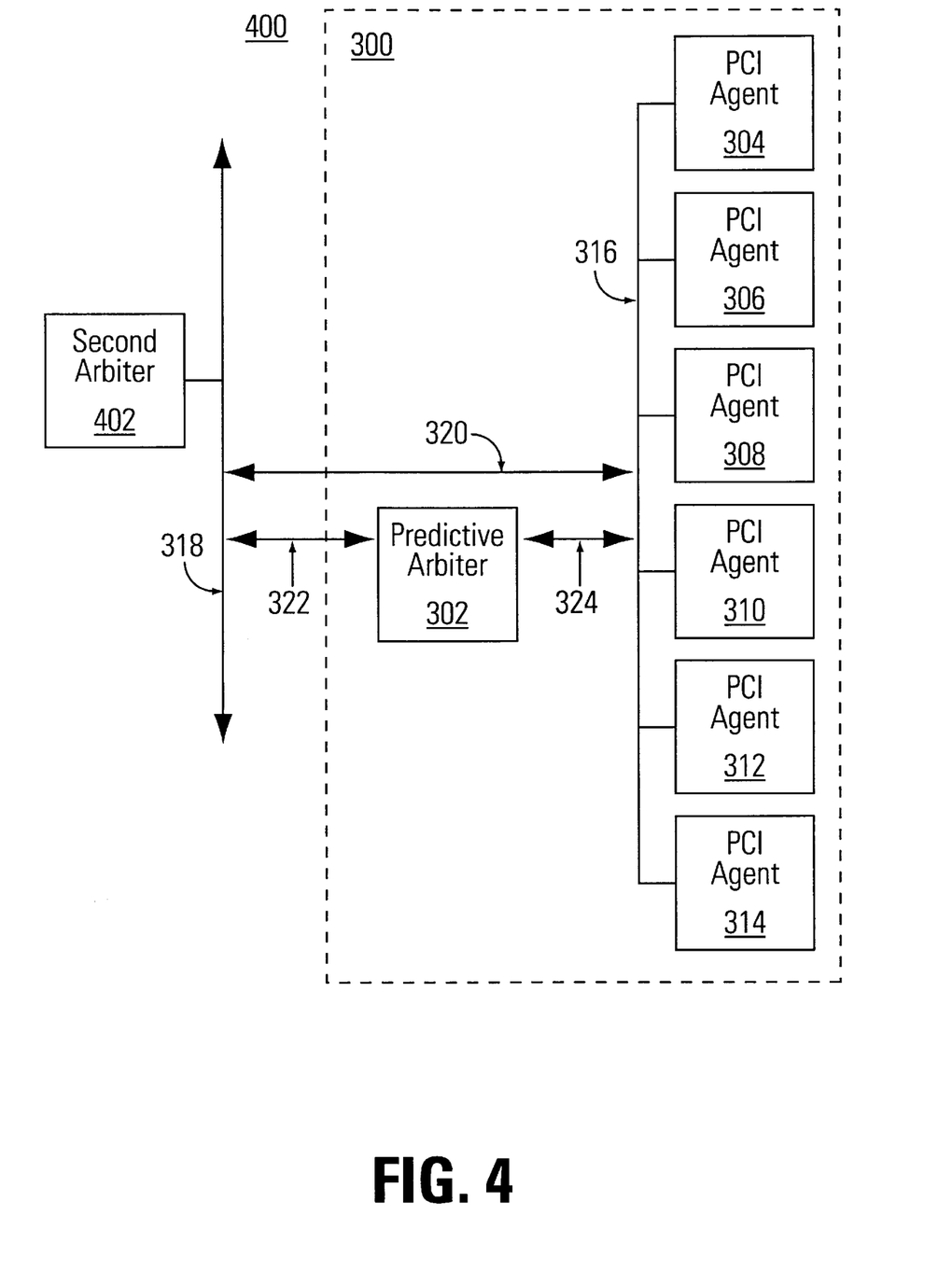
FIG. 4 shows a schematic diagram illustrating components of an arbitration system in accordance with one embodiment of the present invention.

With reference now to FIG. 4, a schematic diagram illustrating components of an arbitration system 400 in accordance with one embodiment of the present invention is shown. In the present embodiment, the predictive arbitration system of the present invention comprises an integrated circuit (IC) 300 containing the predictive arbiter 302 coupled to the plurality of PCI agents 304–314 via a first PCI bus 316. The first PCI bus 316 is coupled to a second PCI bus 318 via bus connection 320. Bus connection 322 and bus connection 324 couple predictive arbiter 302 to second PCI bus 318 and first PCI bus 316 respectively. A second arbiter 402 is also coupled to the second PCI bus 318 and is coupled to the predictive arbiter 302 via second PCI bus 318.

The predictive arbitration system 300 of the present invention interfaces the plurality of PCI agents 304–314 coupled to the first PCI bus 316 with the second PCI bus 318. The first PCI bus 316 and the second PCI bus 318 are logically coupled together. As such, at any given instant, there is only one PCI agent driving either the first PCI bus 316 or the second PCI bus 318. Thus, the predictive arbiter 302 and the second arbiter 402 cooperatively select which PCI agent will receive ownership of the first PCI bus 316 and second PCI bus 318 (hereafter referred to as PCI busses). This is accomplished through shared management of the request signal and the grant signal defined by the PCI specification. The shared management of the request signal and grant signal is described in detail below.

Referring still to FIG. 4, read and write transfers over the PCI busses are performed using burst transfers consisting of a single address phase followed by two or more data phases. A PCI agent granted ownership of the PCI busses (an initiating PCI agent) only has to arbitrate once for ownership. The start address and the transaction type are issued by the initiating PCI agent during an address phase. The target PCI agent latches the start address into an address counter and is responsible for incrementing the address from data phase to data phase, resulting in a fast and efficient transfer of data from the initiating PCI agent to the target PCI agent. The length of the burst is communicated between the initiating PCI agent and target PCI agent and may be of any length. The PCI bus specification standardizes the basic rules PCI agents follow in acquiring, using, and relinquishing the PCI busses. When an initiating PCI agent requires the use of the PCI busses to perform a data transfer, it arbitrates for ownership. The plurality of PCI agents 304–314 coupled to the first PCI bus 316 request ownership of the PCI busses by signaling the predictive arbiter 302 via the first PCI bus 316. In the same manner, an initiating PCI agent (not shown) coupled to the second PCI bus 318 requests ownership of the PCI busses by signaling the second arbiter 402 via the second PCI bus 318.

In the arbitration system 400, the second arbiter 402 interfaces with the predictive arbiter 302 of the predictive arbitration system 300 as if the predictive arbiter 302 where one initiating PCI agent among other initiating PCI agents (not shown) coupled to the second PCI bus 318. The predictive arbiter 302 requires a grant of ownership of the PCI busses from the second arbiter 402 in order to subsequently grant ownership of the PCI busses to one of the plurality of PCI agents 304–314. The PCI specification does not define the method used by the second arbiter 402 to decide among competing initiating PCI agents, thus, the arbitration algorithm used by the second arbiter 402 is often system specific. When the second arbiter 402 determines that it is a certain initiating PCI agent's turn to use the PCI busses, it signals that initiating PCI agent via the second PCI bus 318 (i.e., asserting that initiating PCI agent's GNT# line). It should be appreciated that the second arbiter 402 may deassert an initiating PCI agent's GNT# on any PCI clock edge. If GNT# is deasserted and an initiating PCI agent is in the midst of a data transaction, that current transaction is valid and the transfer will continue. The deassertion of GNT# by the second arbiter 402 indicates that the initiating PCI agent will no longer own the bus at the completion of the transaction currently in progress. Thus, the initiating PCI agent maintains ownership of the PCI busses while the current transaction is still in progress and signals the other initiating PCI agents when completing the final data transfer of the current transaction. The GNT# to one initiating PCI agent can be deasserted simultaneously with the assertion of another initiating PCI agent's GNT# if the PCI busses are not in an idle state. The second initiating PCI agent starts a transaction when the bus becomes idle.

Referring still to FIG. 4, the plurality of PCI agents 304–314 arbitrate for ownership of the PCI busses transparently, in that they make no distinction between the first PCI bus 316 or the second PCI bus 318, or between the predictive arbiter 302 and the second arbiter 402. Each of the plurality of agents 304–314 follow the rules defined by the PCI specification and arbitrate for PCI bus ownership. The predictive arbiter 302 of the present invention insures they interface properly. The predictive arbiter 302 of the present invention arbitrates among the initiating PCI agents residing on the first PCI bus 316. The predictive arbiter 302 allows the plurality of PCI agents on the first PCI bus 316 to share the request and grant signal pair from the second arbiter 402, and thus, share the logically coupled first PCI bus 316 and second PCI bus 318. The predictive arbiter 302 arbitrates between requests from the plurality of PCI agents 305–314 and issues a resulting request to the second arbiter 402. When the grant signal from the central arbiter is returned, the predictive arbiter 302 routes the grant signal to the selected PCI agent in the manner described in FIG. 3. If the PCI busses are idle, the selected PCI agent immediately begins its data transaction.

Thus, the present invention provides a more efficient method of adding more PCI agents. Using the present invention, additional PCI agents can be added to a PCI bus without the added expense of hardware implementing a fall PCI to PCI bridge function. Additionally, the predictive arbitration system 300 of the present invention eliminates the system memory transfer latencies inherent in a PCI to PCI bridge.

Figure 5:
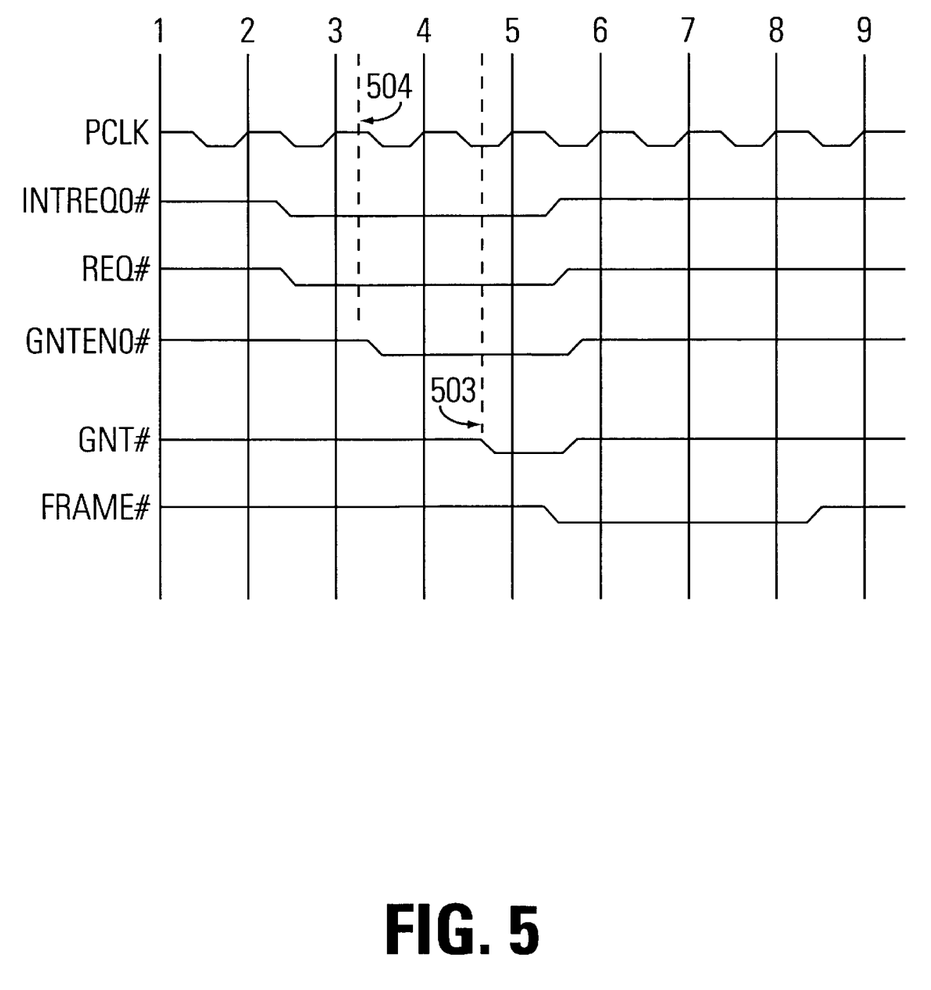
FIG. 5 shows a timing diagram of an exemplary write transaction using the predictive arbiter of the present invention.

Referring now to FIG. 5, a timing diagram of an exemplary write transaction using the predictive arbiter 302 of the present invention and PCI agent 304 is shown. For illustration purposes, PCI agent 304 is the initiating PCI agent in the exemplary write transaction. PCI agent 304 sends an internal request INTREQ0# to the predictive arbiter 302 on the rising edge of clock 3. The predictive arbiter 302 arbitrates between the request from the PCI agent 304 and any other request from any of the plurality of PCI agents 304–314, simultaneously sending a request to the second arbiter 402 on the rising edge of clock 3. The second arbiter 402 returns a grant on clock cell 5.

The predictive arbiter 302 predicts a destination for a grant signal before the return of the grant signal from the second arbiter 402. The predictive arbiter 302 selects the highest priority one of the requesting PCI agents (e.g., PCI agent 304) and enables that PCI agent's respective grant line by asserting that PCI agent's respective grant enable line (e.g., GNTEN 0# from FIG. 3) prior to the return of the grant signal GNT# from the second arbiter 402. This is represented by line 503, the assertion of GNTEN 0#, and line 504, the assertion of GNT#. Active low AND gate 324 activates very quickly, such that PCI agent 304 receives the grant signal by the rising edge of clock cell 5. The PCI agent 304 then waits for the PCI busses to become idle. This is accomplished by sampling the state of PCI bus signals FRAME#, IRDY# (not shown), and GNT# (all standard PCI specification signals and well known in the art), on the rising-edge of each clock via the first PCI bus. When both are sampled deasserted (on the rising-edge of clock 5), the PCI busses are idle and a transaction may be initiated by PCI agent 304. The PCI agent 304 now has ownership of the PCI busses.

At the start of clock cell 5, PCI agent 304 asserts PCI signal FRAME# to indicate its transaction has begun and that a valid start address and command are present on the PCI busses. FRAME# remains asserted until PCI agent 304 is ready to complete the last data phase. At the same time that PCI agent 304 asserts FRAME#, it drives the start address and the transaction type onto the onto the PCI busses. The address and transaction type are driven onto the PCI busses for the duration of clock 5. In addition, GNT# is deasserted by the second arbiter 402, indicating PCI agent 304 should relinquish ownership of the PCI busses after completion of the current transaction. At the start of clock cell 6, PCI agent 304 drives the first data item onto the PCI busses. PCI agent 304 doesn't deassert FRAME# when it samples GNT# deasserted because this is not the final data phase of the current transaction. The target accepts the first data item from the PCI busses on the rising-edge of clock 7, completing the first data phase. During clock cell 7, PCI agent 304 drives the second data item onto the PCI busses. It also does not deassert FRAME#, thereby indicating that it is ready to complete the second data phase and that this is not the final data phase. The target accepts the second data item from the bus on the rising-edge of clock 8, completing the second data phase. During clock cell 8, PCI agent drives the final data item onto the PCI busses. It also deasserts FRAME# to indicate that this is the final data phase. The target samples FRAME# deasserted, indicating that the final data phase is in progress. At the rising-edge of clock 9, the target accepts the final data item from the PCI busses. During clock cell 9, the PCI agent 304 ceases driving data onto the PCI busses and deasserts IRDY# (not shown), returning the PCI busses to an idle state.

Figure 6:
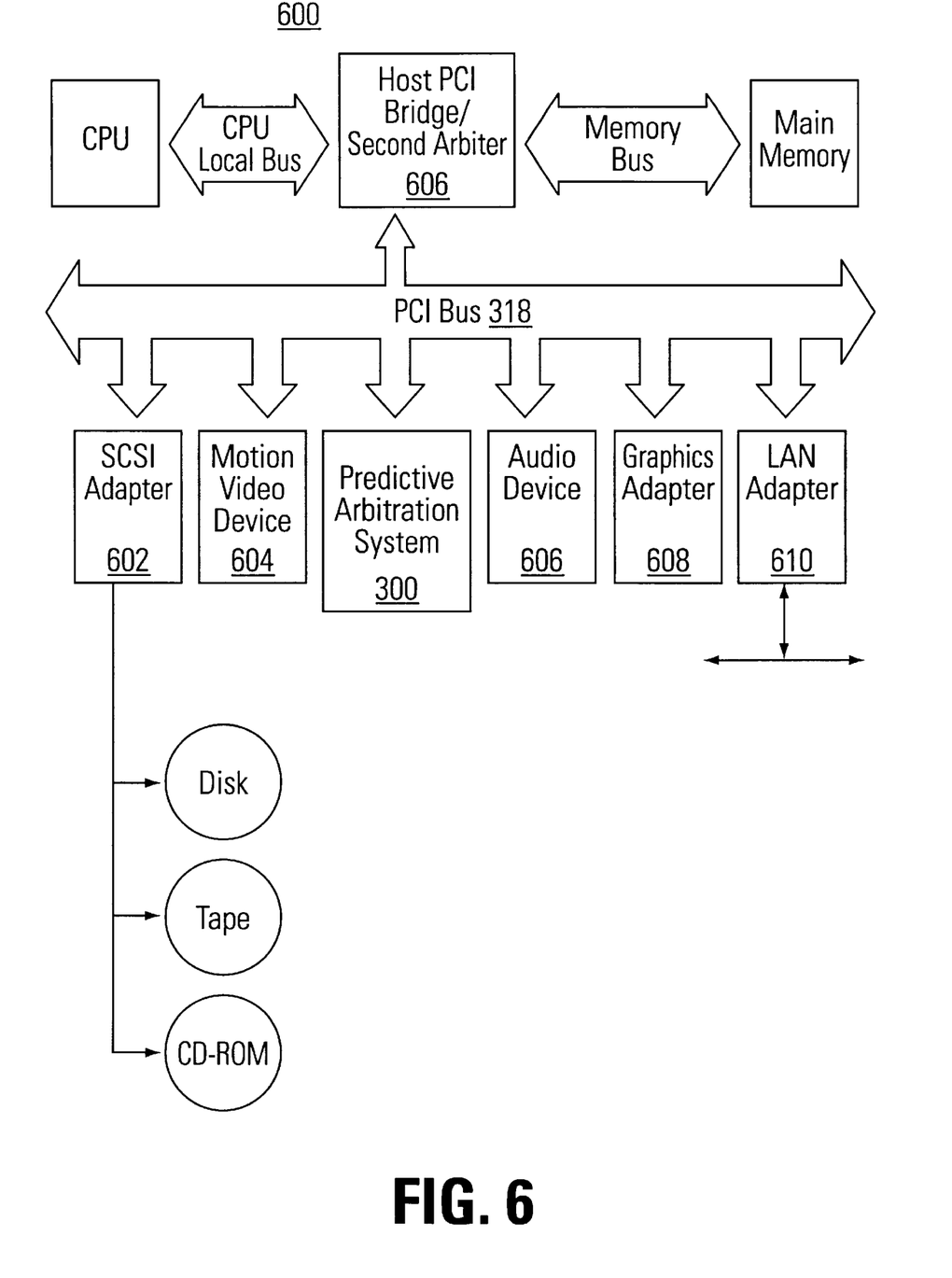
FIG. 6 shows a PCI bus architecture including a predictive arbitration in accordance with the present invention.

Referring now to FIG. 6, a PCI bus architecture 600 including a predictive arbitration system 300 in accordance with one embodiment of the present invention is shown. The predictive arbitration system 300 couples to the second arbiter 402 via the second PCI bus 318 in the manner described above. It should be appreciated that PCI bus architecture 600 includes not only the PCI agents 602, 604, 606, 608, and 610, PCI bus architecture 600 also includes the plurality of PCI agents 304–314 within the predictive arbitration system 300. Thus, in the present embodiment, the predictive arbitration system 300 effectively doubles the number of PCI agents available to PCI bus architecture 600, and does so without regard to the limitations of the host PCI bridge/second arbiter 402 chipset.

Figure 7:
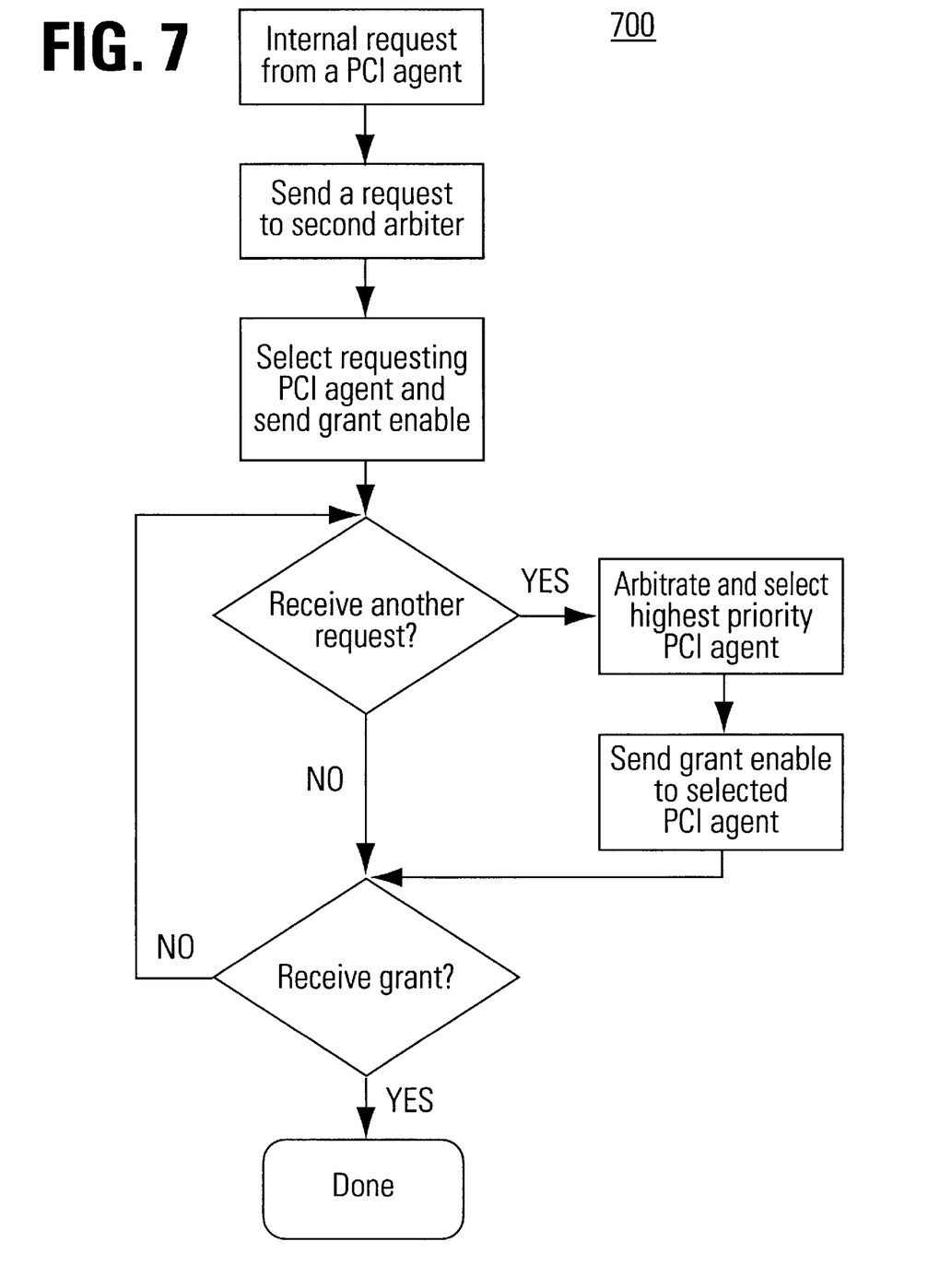
FIG. 7 shows a flow chart showing the steps of one embodiment of the present invention.

Referring now to FIG. 7, a flowchart showing the steps 700 of one embodiment of the present invention is shown. In step 702, the predictive arbiter 302 receives an internal request signal from a PCI agent coupled to the first PCI bus 316. In step 704, the predictive arbiter 302 forwards the internal request signal to the second arbiter 402 as a request signal via the second PCI bus 318. In step 706, the predictive arbiter 302 selects a requesting PCI agent and sends a grant enable signal. In so doing, the predictive arbiter 302 has selected the destination of the grant signal before the grant signal is returned from the second arbiter 402.

In step 708, the predictive arbiter 302 continues to sample the plurality of PCI agents 304–314 coupled to the first PCI bus 316 for any additional internal request signals. The predictive arbiter 302 continues such sampling until the return of the grant signal from the second arbiter 402. In step 710, when the grant signal is received from the second arbiter 402, the process ends in step 712, since the grant signal is immediately received by the selected requesting PCI agent (which received the grant enable signal from the predictive arbiter 302).

Referring still to FIG. 7, in step 708, when there is another internal request signal from another of the plurality of PCI agents 304–314 coupled to the first PCI bus 316, the predictive arbiter 302 arbitrates among the requesting PCI agents and selects the highest priority PCI agent in step 714. In step 716, the predictive arbiter 302 sends a grant enable signal to the selected PCI agent, thereby enabling the selected PCI agent to receive the grant signal when it is returned from the second arbiter 402. In step 710 and step 708, the predictive arbiter 302 of the present embodiment continues to update the selected PCI agent. Step 714 and step 716 are repeated for each new internal request received, thereby ensuring that when the grant signal from the predictive arbiter 302 is received in step 710, the grant signal will be received by the highest priority requesting PCI agent. In so doing, the predictive arbiter 302 of the present invention continually updates the selected PCI agent in advance of receiving the grant signal from the second arbiter 402.

Thus, a system and method for predictive arbitration for PCI bus agents is disclosed. The predictive arbitration system of the present invention efficiently allocates PCI bus bandwidth among PCI agents of differing priority without adding unnecessary latency to the arbitration process. The predictive arbitration system of the present invention efficiently interfaces additional PCI agents to an existing PCI bus architecture without incurring the performance and expense penalties of adding a PCI-to-PCI bridge.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A predictive arbitration system for interfacing a plurality of PCI agents coupled to a first peripheral component interconnect (PCI) bus with a second PCI bus, said predictive arbitration system comprising:
    a first PCI bus adapted to transmit data signals thereon;
    a plurality of PCI agents coupled to said first PCI bus; and
    a predictive arbiter coupled to said first PCI bus and a second PCI bus, said predictive arbiter further coupled to said plurality of PCI agents, said predictive arbiter configured to receive a plurality of requests for access to said second PCI bus by respective said plurality of PCI agents, said predictive arbiter adapted to select and transmit one of said requests to a second arbiter coupled to said second PCI bus, said selected and transmitted request originating from a selected one of said plurality of PCI agents, said predictive arbiter adapted to receive a grant signal from said second arbiter responsive to said selected and transmitted request, said predictive arbiter further comprising:
        a predictive arbitration system for enabling a grant line coupled to said selected one of said plurality of PCI agents before said grant signal is received from said second arbiter said predictive arbiter is adapted update said selection on a clock cycle to clock cycle basis.

2. The predictive arbitration system of claim 1, wherein said first PCI bus, said plurality of PCI agents, and said predictive arbiter are integrated into a single integrated circuit.

3. The predictive arbitration system of claim 2, wherein said second PCI bus is coupled to a CPU of a computer system and said first PCI bus and said second PCI bus are logically coupled to exchange data between said first PCI bus and said second PCI bus.

4. The predictive arbitration system of claim 1, wherein said predictive arbiter is a synchronous state predictive arbiter adapted to run synchronously with a clock of said second arbiter to facilitate the interface of said plurality of PCI agents.

5. The predictive arbitration system of claim 4, wherein said predictive arbitration system enables said grant line within one clock cycle from when said grant signal is transmitted from said second arbiter.

6. The predictive arbitration system of claim 1, wherein the plurality of PCI agents includes at least one higher priority PCI agent and said plurality of requests for access includes at least one respective high priority request from said at least one higher priority PCI agent, said predictive arbiter adapted to determine a selection, and wherein said selection includes selecting said at least one higher priority PCI agent and enabling a grant line coupled to said at least one higher priority PCI agent before said grant signal is received from said second arbiter.

7. The predictive arbitration system of claim 6, wherein said predictive arbiter is adapted on update said selection one a clock cycle to clock cycle basis, such that said selection is continuously refined until said grant signal is received from said second arbiter.

8. A predictive arbitration method for selectively interfacing a plurality of peripheral component interconnect (PCI) agents with second PCI bus, said predictive arbitration method comprising the steps of:
    a) receiving at a predictive arbiter an internal request from any of a plurality of PCI agents for access to either a first PCI bus or a second PCI bus;
    b) transmitting a request to a second arbiter coupled to said second PCI bus; and
    c) enabling a grant line coupling said predictive arbiter to a requesting one of said plurality of PCI agents before a grant signal is received at said predictive arbiter from said second arbiter; and
    d) updating a selection of said grant line wherein said predictive arbiter is adapted to update said selection on a clock cycle to clock cycle basis.

9. The predictive arbitration method of claim 8, wherein step a) further comprises the steps of:
    sampling at the predictive arbiter a plurality of internal request lines coupled to said plurality of PCI agents; and
    receiving a plurality of requests from said plurality of PCI agents via said plurality of internal request lines.

10. The predictive arbitration method of claim 8, wherein step b) further comprises transmitting said request to said second arbiter via a request line coupled to said second arbiter, said request transmitted upon reception of said internal request, and wherein said request is a request from any of a plurality of PCI agents.

11. The predictive arbitration method of claim 8, wherein step c) further comprises the steps of:

selecting a requesting PCI agent to receive said grant signal;

sending a grant enable signal to said selected requesting PCI agent such that a grant line coupled to said selected requesting PCI agent is enabled.

12. The predictive arbitration method of claim 11, further comprising the steps of:

determining whether a request from a higher priority PCI agent, out of the plurality of PCI agents, is received; and updating said selected requesting PCI agent, such that said higher priority PCI agent becomes said selected PCI agent.

13. A predictive arbitration system for interfacing a plurality of PCI agents to a peripheral component interconnect (PCI) bus, comprising:

a PCI bus adapted to transmit data signals thereon;

a plurality of PCI agents coupled to said PCI bus; and a predictive arbiter coupled to said PCI bus, said predictive arbiter further coupled to said plurality of PCI agents, said predictive arbiter configured to receive a plurality of internal requests for access to said PCI bus by respective said plurality of PCI agents, said predictive arbiter adapted transmit a request to a second arbiter coupled to said second PCI bus, said request responsive to said plurality of internal requests from said plurality of PCI agents, said predictive arbiter adapted to receive a grant signal from said second arbiter responsive to said transmitted request, said predictive arbiter further comprising:

a predictive arbitration system for granting said PCI bus to a selected one of said plurality of PCI agents before said grant signal is received from said second arbiter, said predictive arbiter is adapted to update said selection on a clock cycle to clock cycle basis.

14. The predictive arbitration system of claim 13 further comprising a second PCI bus, said second arbiter coupled to said second PCI bus, said second PCI bus coupled to said PCI bus.

15. The predictive arbitration system of claim 14, wherein said PCI bus, said plurality of PCI agents, and said predictive arbiter are integrated into a single integrated circuit.

16. The predictive arbitration system of claim 15, wherein said second PCI bus is coupled to a CPU of a computer system and said first PCI bus and said second PCI bus are logically coupled to exchange data between said first PCI bus and said second PCI bus.

17. The predictive arbitration system of claim 15, wherein said predictive arbiter is a synchronous state predictive arbiter and runs synchronously with a clock of said second arbiter to facilitate the interface of said plurality of PCI agents.

18. The predictive arbitration system of claim 17, wherein said predictive arbitration system enables said grant line within one clock cycle from when said grant signal is transmitted from said second arbiter.

19. The predictive arbitration system of claim 18, wherein the plurality of PCI agents includes at least one higher priority PCI agent and said plurality of requests for access includes at least one respective high priority request from said at least one higher priority PCI agent, said predictive arbiter adapted to determine a selection, and wherein said selection includes selecting said at least one higher priority PCI agent and enabling a grant line coupled to said at least one higher priority PCI agent before said grant signal is received from said second arbiter.

20. The predictive arbitration system of claim 19, wherein said predictive arbiter is adapted on update said selection one a clock cycle to clock cycle basis, such that said selection is continuously refined until said grant signal is received from said second arbiter.

21. A predictive arbitration system for interfacing a plurality of PCI agents coupled to a first peripheral component interconnect (PCI) bus with a second PCI bus, said predictive arbitration system comprising:

a first PCI bus adapted to transmit data signals thereon;

a plurality of PCI agents coupled to said first PCI bus; and a predictive arbiter coupled to said first PCI bus and a second PCI bus, said predictive arbiter further coupled to said plurality of PCI agents, said predictive arbiter configured to receive a plurality of requests for access to said second PCI bus by respective said plurality of PCI agents, said predictive arbiter adapted to select and transmit one of said requests to a second arbiter coupled to said second PCI bus, said selected and transmitted request originating from a selected one of said plurality of PCI agents, said predictive arbiter adapted to receive a grant signal from said second arbiter responsive to said selected and transmitted request, said predictive arbiter further comprising:

a predictive arbitration system for enabling a grant line coupled to said selected one of said plurality of PCI agents before said grant signal is received from said second arbiter, wherein the plurality of PCI agents includes at least one higher priority PCI agent and said plurality of requests for access includes at least one respective high priority request from said at least one higher priority PCI agent, and wherein said predictive arbiter is further adapted update said selection on a clock cycle to clock cycle basis, such that said selection is continuously refined until said grant signal is received from said second arbiter.

22. The predictive arbitration system of claim 21, wherein said first PCI bus, said plurality of PCI agents, and said predictive arbiter are integrated into a single integrated circuit.

23. The predictive arbitration system of claim 22, wherein said second PCI bus is coupled to a CPU of a computer system and said first PCI bus and said second PCI bus are logically coupled to exchange data between said first PCI bus and said second PCI bus.

24. The predictive arbitration system of claim 21, wherein said predictive arbiter is a synchronous state predictive arbiter adapted to run synchronously with a clock of said second arbiter to facilitate the interface of said plurality of PCI agents.

25. The predictive arbitration system of claim 21, wherein said predictive arbitration system enables said grant line within one clock cycle from when said grant signal is transmitted from said second arbiter.

* * * * *